July 4, 1950
R. E. MOE
2,513,954
SYNCHRONIZED PULSE GENERATOR
Original Filed Sept. 28, 1942
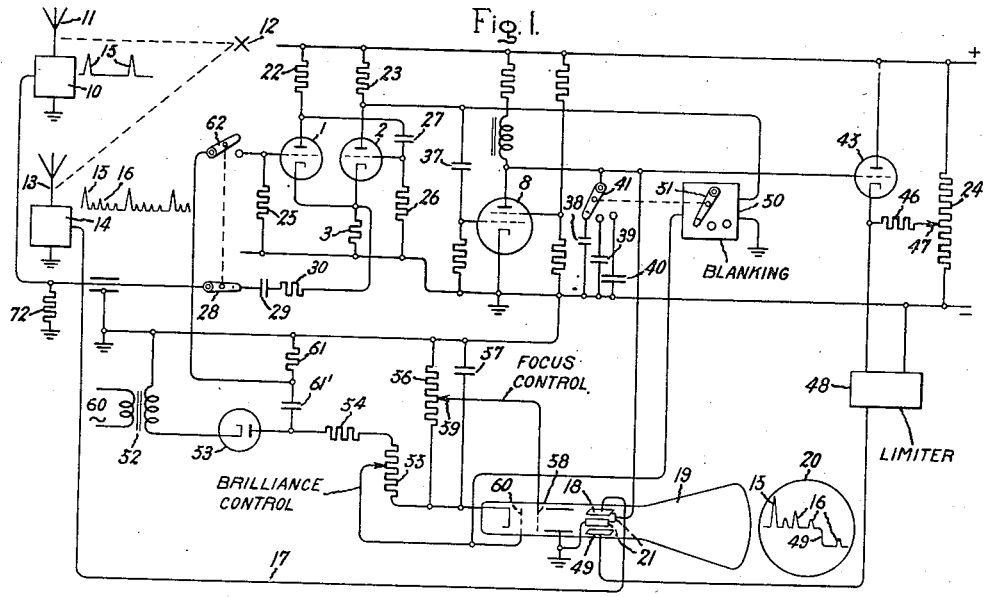
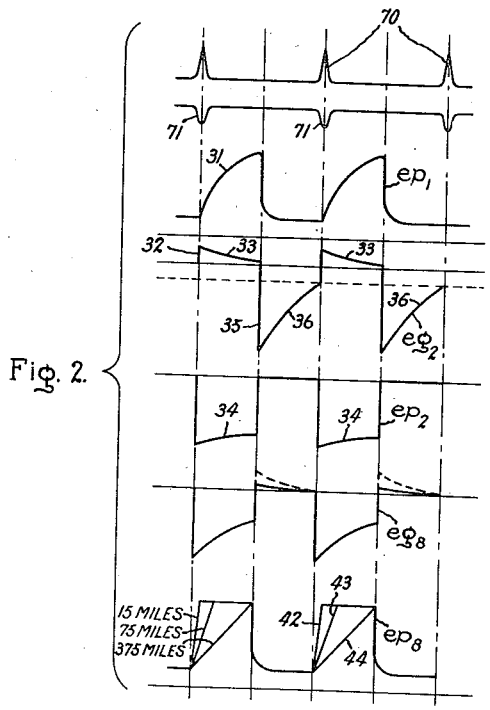
Inventor:
Robert E. Moe,
by Harry E. Dunham
His Attorney.

Patented July 4, 1950

2,513,954

UNITED STATES PATENT OFFICE 2,513,954

SYNCHRONIZED PULSE GENERATOR

Robert E. Moe, Bridgeport, Conn., assignor to General Electric Company, a corporation of New York Original application September 28, 1942, Serial No. 459,894. Divided and this application May 16, 1945, Serial No. 594,090

1 Claim. (Cl. 250—27)

My invention relates to pulse generators and to means for maintaining the operation thereof synchronous with desired pulsating potentials.

My invention has for one of its objects to effect certain improvements therein whereby synchronizing potentials may be applied to the pulse generator without adversely affecting the timing circuit of the pulse generator.

A further object of my invention is to provide a pulse generator of the multivibrator type in which synchronizing potentials are applied at points isolated from the timing circuit of the multivibrator by the interelectrode spaces within the discharge devices employed.

A further object of my invention is to provide a multivibrator to which synchronizing pulses of either positive or negative polarity may be applied without adversely affecting the action of the multivibrator even though such pulses be supplied from low impedance circuits.

My present application is a division of my application, Serial No. 459,894, now Patent 2,414,323, granted January 14, 1947, filed September 28, 1942, and entitled Cathode Ray Apparatus and which is assigned to the assignee of my present application.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention and Fig. 2 represents certain characteristics pertaining to its operation.

Referring to Fig. 1 of the drawing, I have illustrated my invention as employed in a radio echo equipment in which pulses of radio frequency energy produced in a transmitter 10 are radiated from an antenna 11. These pulses travel through space to a remote object 12, such, for example, as a remote aircraft, or other reflector of radiant energy, whereby they are reflected back to a receiving antenna 13 of a pulse receiver 14 associated with the transmitter.

Of course, the outgoing radio frequency pulses which are indicated at 15 in Fig. 1 are received directly from the radiator 11 with greater intensity than the echoes thereof are received. Thus in the receiver the radiated pulses 15 and various echoes 16 thereof appear as indicated in Fig. 1. These pulses are, of course, amplified and rectified and supplied over a conductor 17 to one of the vertical deflection plates 18 of a cathode ray device 19.

This cathode ray device may have a viewing screen indicated by the circle 20 upon which the outgoing pulses 15 and the various echoes 16 are caused to appear producing an indication such as that represented in Fig. 1 in the circle 20.

The cathode ray of the cathode ray device 19 is deflected horizontally across the scale thereof by means of deflection voltage applied between its horizontal deflection plates 21 from the output of an electron discharge device 8, the latter of which is controlled by the multivibrator of my present invention comprising discharge devices 1 and 2. These discharge devices have their cathodes connected together and through a resistance 3 to ground. Their anodes are connected through individual resistors 22 and 23 to the positive side of the source of operating potential. This source of operating potential is indicated by plus and minus signs at the right hand side of the drawing, and is shunted by a potentiometer resistance 24. The discharge devices 1 and 2 are each provided with a control electrode, each of which is connected to ground through a respective resistance 25 and 26. Condenser 27 is connected between the anode of the device 1 and the control electrode of the device 2 and cooperates with resistances 22 and 26 to determine the duration of the successive periods in the cyclic operation of the generator comprising devices 1 and 2. This generator is synchronized with the radiated pulses by means of positive unidirectional pulses generated in the transmitter 10 simultaneously with the radiated pulses which are supplied through switch 28, condenser 29 and resistance 30 to the cathodes of the two devices 1 and 2.

The operation of this generator comprising discharge devices 1 and 2 and also the device 8 may best be explained by referring to the curves of Fig. 2.

Let us consider this generator at a period in its operation when the discharge device 1 is conducting. This device passes current through resistance 22 and resistance 3, the bias on resistance 3 being sufficient to prevent the flow of anode current in the device 2. If now a positive pulse, such as those indicated at 70 in Fig. 2, be received from transmitter 10 through elements 28, 29 and 30 upon the cathodes of the two devices, it tends to reduce the anode current in the device 1. This reduction in anode current, of course, reduces the bias on device 2 and increases the anode potential on device 1 the latter of which is reflected in a more positive potential on the control electrode of device 2. Device 2 thus starts to pass current, producing increased bias on the resistance 3. This increased bias immediately interrupts the flow of anode current in the device 1. The potential on the anode of device 1 does not immediately rise but is delayed in its rise by reason of the time required for condenser 27 to charge. The result is that the potential on the anode of device 1 rises in accordance with the rising portions 31 of the curve $ep_1$ of Fig. 2.

The charging current in condenser 27, however, rises immediately to its largest value, this current flowing through resistance 26 and producing a positive bias on the grid of discharge device 2. This positive bias at its largest value is indicated at 32 in the curve $eg_2$ of Fig. 2. Of course, as the condenser charges its charging current gradually diminishes in accordance with the slope 33 of the curve $eg_2$. The discharge device 2, however, is conducting during this period, its anode current gradually reducing. Its anode potential gradually rises from its lowered value in accordance with the portions 34 of the curve $ep_2$.

Condenser 27 finally becomes charged to such a point, and the anode current in device 2 is sufficiently reduced, to permit device 1 again to become conducting. When this occurs, the anode potential on device 1 drops to a low value thereby driving the grid of device 2 strongly negative as indicated by the portion 36 of the curve $eg_2$. Plate current in the device 2, of course, then increases to the highest value indicated by the curve $ep_2$. Condenser 27 then discharges in accordance with the portions 36 of the curve $eg_2$ through resistance 26, device 1 and resistance 3, this discharge continuing until finally a second synchronizing pulse arrives from the transmitter. Resistance 3 is of low value relative to resistance 26 and the time of discharge of condenser 27 is determined practically entirely by resistance 26. This synchronizing pulse again causes the device 2 to become conducting, as previously described, and the cycle of operations is repeated.

The plate potential on the device 2 thus varies periodically in accordance with the curve $ep_2$ of Fig. 2. This potential is supplied through the condenser 37 to the control electrode of electron discharge device 8, where it produces a variation in voltage indicated by the curve $eg_8$ of Fig. 2. This curve varies in shape somewhat from the curve $ep_2$ by reason of the differentiating action of the condenser 37, which is of large capacitance. However, when the voltage on the grid of discharge device 8 is driven negative, its anode current is interrupted, producing a rise in its anode voltage. The rate of rise of this anode voltage is determined by the capacity of a condenser 38, which is connected between the anode and cathode of this device through a selector switch 41. This switch is arranged to be positioned in any of three positions to connect between the anode and cathode any of three condensers 38, 39, or 40 having different capacities. Thus the voltage on the anode may be made to rise at any one of three rates as indicated by the slopes 42, 43 and 44 of the curve $ep_3$ in Fig. 2. The voltage across this condenser is applied between the horizontal deflection plates 21 of the cathode ray tube and the rate of rise of this voltage thus determines the rate at which the beam in the cathode ray device is deflected horizontally across the screen. Thus, for example, if the condenser 38 be in circuit, the deflection across the viewing screen may be produced in the time that is required for a radiated pulse to travel to a remote object 15 miles away and return. If condenser 39 be in circuit, the ray is deflected across the viewing screen in the time required for a pulse to travel to a remote object 75 miles away and return, and, similarly, if condensers 40 be included in the circuit, the ray is deflected across the screen more slowly and in a time required for the pulse to travel to a remote object 375 miles away and return. Thus the switch 40 determines the range of the equipment, and the slopes 42, 43 and 44 of the curve $ep_3$ in Fig. 2 bear the legends "15 miles," "75 miles" and "375 miles," respectively, corresponding to the ranges of the equipment which may be determined by the switch 40.

It is desirable in the operation of equipment such as that described that means be provided to produce an indication upon the cathode ray screen to identify a particular echo, for example, which is indicated thereon. For this purpose the discharge device 45 is provided. The voltage on the anode of device 8 is supplied to the control electrode of this device and its cathode is connected through a resistance 46 to a variable contact 47 on the potentiometer resistance 24. When the anode potential of device 8 is at its lowest value, device 45 is non-conducting by reason of the positive potential supplied to its cathode from resistance 24. However, as the voltage rises in accordance with the slopes 42, 43 and 44 of curve $ep_3$, a point is reached where device 45 becomes conducting and produces a voltage on resistance 46. This voltage is supplied to an amplifier and limiter 48 whereby it is limited to a fixed value and thence to the lower anode 49 of the vertical deflection plates of the cathode ray tube. This potential produces the vertical deflection 49 shown in the circle 20 on the cathode ray oscillograph; that is, the cathode ray is deflected across the screen horizontally to a point where it is suddenly deflected downwardly and then afterwards proceeds horizontally in its course across the screen. This deflection 49 may be caused to appear at any desired point in the horizontal trace across the screen of the oscillograph by varying the contact 47, thus changing the point in the rise in anode voltage of device 8 where device 45 becomes conducting. Thus the deflection 50 may be positioned to coincide with the indication of any echo to be identified and particularly observed.

The equipment 50 comprises blanking equipment to interrupt the ray of the cathode ray device at times other than during the forward trace across the fluorescent screen. It is supplied with the anode voltages of device 2 and responds to supply negative pulses to the control electrode 60 of the cathode ray device, each pulse being sufficiently long to interrupt the cathode ray during the entire time between completion of one forward trace and initiation of the next. Switch 51 in this equipment is uncontrolled with switch 41 and operates to effect suitable variation in the duration of these negative pulses to accommodate the different durations of the forward trace.

The high voltage for operating the cathode ray device is supplied from a source of alternating potential indicated at 52. This potential, which may have a frequency of 60 cycles, is supplied through a transformer and rectifier 53, which may be any suitable unilateral conducting device, but which preferably is a diode, to a load circuit comprising resistors 54, 55 and 56. The resistor 56 is shunted by the usual smoothing condenser 57 and has its negative terminal connected to the cathode and a variable positive point thereof connected to the focusing anode 58 of the cathode ray device. The potential on this anode may be varied by varying the contact 59 on the resistance 56 thereby to vary the degree of focusing of the cathode ray upon the fluorescent screen.

The control electrode 60 of the cathode ray device is connected to a variable point on resistance 55 whereby the intensity of the cathode ray may be varied to control the brilliance of the indication produced upon the cathode ray screen.

It is frequently desirable in the operation of equipment such as that described to provide means for operation of the equipment when the transmitter 10 is not in operation and therefore when the synchronizing pulses from the transmitter 10 are not available. To this end, means are provided whereby synchronizing pulses are derived from the rectifier 53. Of course, as is well understood in the operation of peak rectifiers of the type here described, a brief pulse of current flows in the diode 53 at the peak of each alternate half cycle of the wave from the alternating source 52. Thus a brief pulse of current flows in the diode 53 and through resistors 54 and 55 at a frequency of 60 cycles per second, these being the brief pulses of current which restore the charge in the smoothing condenser 57, which leaks off through resistance 56 during the intermediate periods, this phenomena resulting in the familiar ripple or hum voltage which occurs on such smoothing condensers. To derive corresponding pulses for the synchronizing of the generator 1, 2, the resistance 61 and condenser 61' are connected across the output of the rectifier. These pulses of current thus also flow in resistance 61. The intermediate point between resistance 61 and condenser 61' is arranged to be connected through a switch 62 to the control electrode of device 1. The switch 62 is arranged to be unicontrolled with the switch 28 so that it is open when the switch 28 is closed or closed when the switch 28 is open. Thus if the transmitter 10 be not in operation, switches 28 and 62 may be operated to their lower position, in which case synchronizing pulses are derived from the resistance 61 and supplied to the control electrode of the discharged device 1. These pulses control the time when the discharge device 1 becomes nonconducting just as did the positive pulses applied to the cathode of the device. The pulses derived from the transmitter may be such as those indicated at 70 in Fig. 2 and are of positive polarity, whereas those derived from resistance 61 are represented at 71 in Fig. 2 and are of negative polarity.

The circuit of the generator 1, 2 is particularly advantageous for such synchronization because its timing circuit, namely, the circuit 22, 27, 26, is isolated from these synchronizing circuits, including the switches 28 and 62, and thus the low impedances of these synchronizing circuits do not affect the time constant of the timing circuit 22, 27, 26. That is, as previously explained, the charging period of condenser 27 is determined by the resistances 22 and 26, this determining the duration of the negative pulses supplied to the grid of discharge device 8. The discharge period of the condenser 27 is controlled by resistance 26 since device 1 during this period is of very low impedance. This determines the duration of the positive pulse applied to the control electrode of device 8. This circuit 26, 27, 22, however, is isolated from the impedance of the synchronizing circuits and thus the time constant thereof is totally unaffected by the impedance of the synchronizing circuits. This is important because the impedance of these synchronizing circuits may be very low, for example, the resistance of resistance 61 may be of the order of 1,000 ohms, resistance 72 of the order of 100 ohms, and the resistance 30 of the order of 1,000 ohms, these values being such that they would materially affect the time constant of the timing circuit were it not for the fact that these circuits are isolated from the timing circuit by the space paths in the discharge devices 1 and 2.

While I have shown a particular embodiment of my invention, it will of course be understood that I do not wish to be limited thereto since various modifications both in the circuit arrangement and in the instrumentalities employed may be made without departing from the spirit and scope of my invention. I contemplate by the appended claim, however, to cover any such modifications as fall within the true spirit and scope of my invention.

What I claim as new and desire to secure by Letters Patent of the United States is:

A single-pulse generator comprising first and second electron discharge devices in cascade, each having a corresponding anode, cathode and control electrode, a source of operating potential having a positive pole connected through first and second resistors to said first and second anodes respectively and having a negative pole connected through a third common resistor to both said cathodes, means comprising said three resistors and a fourth resistor connected from said first control electrode to said negative pole for normally maintaining said first device conductive and said second device non-conductive, a pulse timing network serially comprising said first resistor, a capacitor connected from said first anode to said second control electrode and a fifth resistor connected from said second control electrode to said negative pole, the time constant of said network determining the rate of charge of said capacitor from said source, and selectively operable means to impress either short negative synchronizing pulses on said first control electrode or short positive synchronizing pulses on said cathodes, said pulses each having sufficient magnitude momentarily to reverse said conditions of conductivity for a time interval determined by said time constant, said network being effectively isolated from said last means by the anode-cathode paths of said devices.

ROBERT E. MOE.

REFERENCES CITED

The following references are of record in the file of this patent:

UNITED STATES PATENTS

| Number | Name | Date |
| --- | --- | --- |
| 2,050,059 | Koch | Aug. 4, 1936 |
| 2,185,363 | White | Jan. 2, 1940 |
| 2,193,850 | Andrieu et al. | Mar. 19, 1940 |
| 2,262,838 | Deloraine et al. | Nov. 18, 1941 |
| 2,272,070 | Reeves | Feb. 3, 1942 |
| 2,390,608 | Miller et al. | Dec. 11, 1945 |
| 2,405,237 | Ruhlig | Aug. 6, 1946 |

FOREIGN PATENTS

| Number | Country | Date |
| --- | --- | --- |
| 552,301 | Great Britain | Mar. 31, 1943 |

OTHER REFERENCES

A Thermionic Trigger, Otto H. Schmitt; Journal of Scientific Instruments (1938), vol. 15.